June 9, 1953   T. M. BENEZET ET AL   2,641,496
PASTRY LIFTER AND SETTER
Filed Aug. 19, 1946
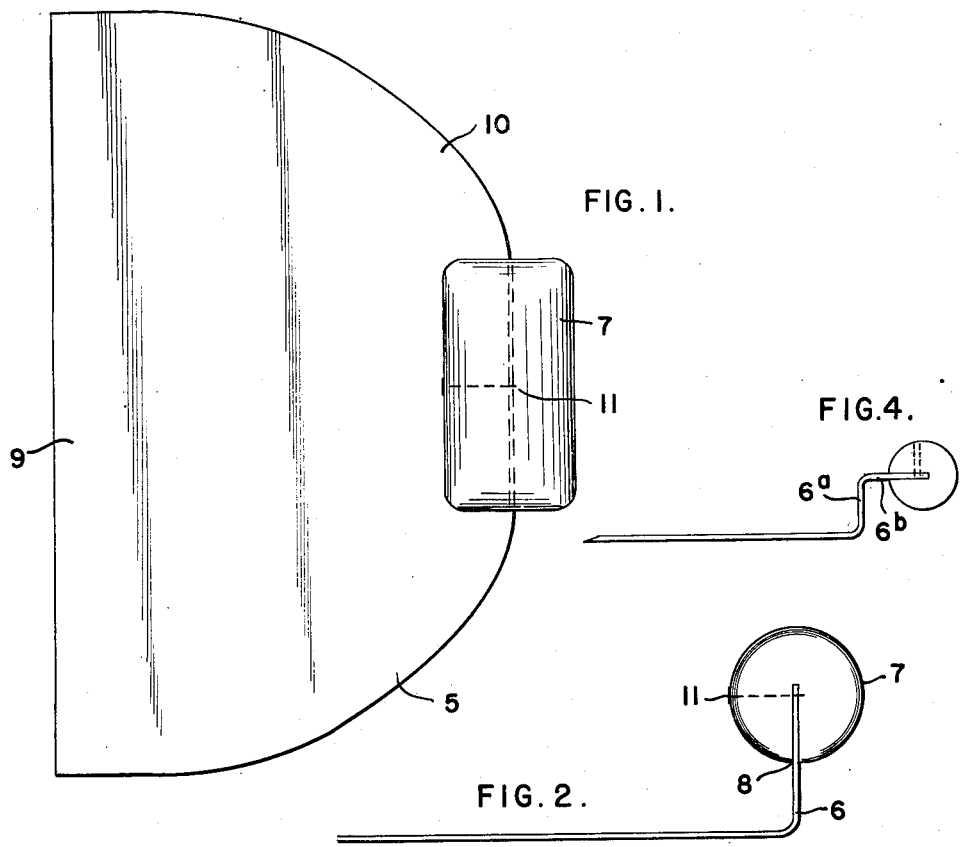
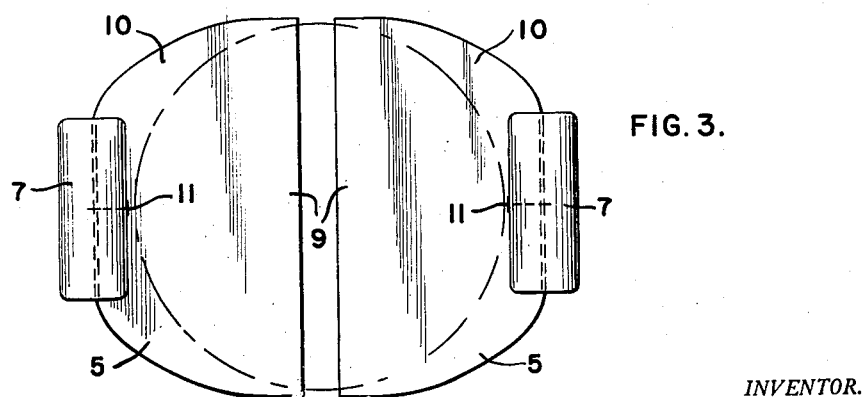
INVENTOR.
THERESA M. BENEZET
WILBERT L. BENEZET
BY Patented June 9, 1953

2,641,496

UNITED STATES PATENT OFFICE 2,641,496

PASTRY LIFTER AND SETTER

Theresa M. Benezet and Wilbert L. Benezet, New York, N. Y.

Application August 19, 1946, Serial No. 691,617

3 Claims. (Cl. 294—1)

This invention relates to culinary articles, and particularly to a device for manipulating or handling pastry in applying it to pie plates or receptacles in the process of baking pies and the like, and may be further defined as a pastry lifter and setter.

It is well known to those versed in the culinary art that the more delectable the pie or pastry, the more fragile and tender the uncooked dough must be, and hence the more difficult it is to lift the rolled out dough from the dough board and transfer it to a pie tin or other receptacle without tearing or otherwise damaging the dough.

An object of the invention is the provision of novel means which will support pastry or dough after it is rolled to a thin state such as attained when the pie covering or dough is to be applied to the pan or like plate, as by its use, breaking or disintegration of the thin layer of dough which is designed for the bottom of the pie, as well as the thin sheet which is to be used as the covering or top crust of the pie, is obviated, and it can be transferred from the rolling board to the pan or pie plate in a manner to prevent creases or wrinkling of the sheet of dough.

By the use of the invention, thickening of the sheet of dough is prevented and, since the dough is not subjected to body heat, due to the manipulation of the hands of the operator, the crust is flakier and the product more satisfactory.

A further object of this invention is to provide a device of this character which is comparatively inexpensive to manufacture and which has proven efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a plan view of one such pastry lifter and setter;

Figure 2 illustrates an end view thereof;

Figure 3 shows a pair of lifters juxtaposed; and

Figure 4 illustrates an end view of a fragment of the lifter with the handle modified.

In practice, two such devices as shown in the drawing are preferably employed, one manipulated by each hand, so that one acts against the other in exerting force to separate the dough from the rolling board and holding it in a spread or flat state while the dough is being applied to the pan as a covering for the filling of the pie or the like, and each member comprises a blade 5 shaped from a sheet of material, such as metal, or it may be of plastic material, and the inventors do not wish to be limited with respect to the material employed. The blade has an integral angularly disposed flange 6 which may be at right angles or oblique with respect to the plane of the blade, and a suitable handle 7 is integral with, mounted on, or attached to the upper edge of the flange to facilitate the manipulation of the blade.

The handle may comprise a cylinder-like element having a slot 8, into which the upper edge of the flange is introduced, and the handle may be attached to the flange by welding or other appropriate means.

The blade should have a straight front edge 9 and the side edges 10 thereof are preferably convex and extend rearwardly where they merge with the flange at the base of the flange, it being shown that the flange is of appropriate length to form an anchorage for the handle. As clearly illustrated in both Figures 1 and 3, the handle 7 extends in parallel relationship to the front edge 9 of the blade 5.

We have ascertained that in using the two lifters for transferring the rolled dough, it is more convenient that the handles be parallel to each other and that the front edges 9 of the lifters be kept in close proximity. This arrangement will prevent the dough from falling through between the lifters when the dough is lifted from the dough board. When the dough is to be deposited into the tin or other receptacle, this is accomplished by merely separating the two lifters.

In Figure 4, the flange 6a has an angularly disposed portion 6b with the handle applied thereto. It is thought readily apparent from the foregoing that the modified form depicted in Figure 4 is used in the same manner as that of Figure 1.

As is apparent from Fig. 3, the pair of blade structures are duplicates, service use of the invention preferably employing the structure in pairs, due to the fact that the area of the layer of dough has at least the areal dimensions of the pie but is generally oversize to permit the usual trimming; hence, the area of the base sheet 5, as shown, does not exceed half of the area of the top of the pie, the straight edge 9 being representative of a diameter of such pie area. As will be understood, in practice, the opposing edges 9 may or may not be in actual contact, depending on the possible oversize of the layer, it being obvious that any small spacing therebetween—as indicated in Fig. 3—is not sufficient to disturb the planar character of the layer when the pair of members are in underlying relation to the layer.

In practice, after the dough has been prepared and has been subjected to the usual rolling action to produce the layer effect and while the layer is on the board, the two members are slid into underlying relation to the layer from opposite end zones of the layer, thus providing a temporary support therefor—depending on the dimensions of the layer—the sheet base of the two members will engage at least a major if not the entire under surface of the layer, to form an efficient support therefor. Since the ends of the base are in the form of upstanding flanges with the handles at the tops thereof, it is obvious that the layer can be bodily raised from the board and carried to a position over the pie plate, where the assembly can be lowered to the desired position relative to the plate, after which the two members can be readily drawn outward toward the respective ends of the layer and thus removed, permitting the layer to gently lower to its resting position, whether it be the under crust or the upper crust of the pie, the lowering action resulting through the gradual separation of the pair of straight edges 9 as the members are withdrawn. And since all other areas of material dimensions are supported during such positioning, the layer need not be of heavy thickness to prevent development of a thinning of the layer in the mid-zone of its area during the positioning as tends to occur when the layer is unsupported; gentle positioning is evidenced by the fact that during withdrawal of the sheet members the portion of the layer being released from support is the zone between the opposite straight edges 9— as these edges present the maximum width, assurance is had that the remaining areas as they are released from support will be subjected to similar action, thereby assuring smooth positioning even when the layer is of reduced thickness type.

We claim:

1. A culinary aid for the preparation of pie pastry and the like, said aid comprising a pair of members each having a body of sheet form contoured to be temporarily combinedly positioned in underlying relation in substantially planar alinement to a prepared crust layer to support the layer for transfer to and positioning on the pie plate utensil preparatory to baking, said members being adapted to be withdrawn after the layer has been positioned and prior to the baking activities, each body presenting a semi-circular area of the combined contour, each body additionally carrying an upstanding flange opposite the straight side of the area with the upper zone of the flange carrying a handle to thereby locate the handles as oppositely spaced beyond the crust area and free to introduce and to withdraw the members relative to the layer.

2. An aid as in claim 1 characterized in that the pair of members are of duplicate form and dimensions, with the body of each including an elongated straight edge opposite the flange zone and positionable in approximate correspondence with a diameter of the layer during the transporting of the latter to the pie plate.

3. An aid as in claim 2 characterized in that the flange zone includes an outward extension at its top with the extension extending in parallelism with the body, the handle being carried by the free end of the extension.

THERESA M. BENEZET.
WILBERT L. BENEZET.

References Cited in the file of this patent

UNITED STATES PATENTS

| Number | Name | Date |
|---|---|---|
| D. 52,990 | Graham | Feb. 11, 1919 |
| D. 55,758 | Easby | July 13, 1920 |
| 695,966 | Thomas | Mar. 25, 1902 |
| 850,582 | Horton | Apr. 16, 1907 |
| 1,641,522 | Beckord | Sept. 6, 1927 |
| 1,728,211 | McClellan | Sept. 17, 1929 |
| 1,746,614 | Sibbald | Feb. 11, 1930 |
| 2,064,136 | Winger | Dec. 15, 1936 |
| 2,446,629 | Brown | Aug. 10, 1948 |

FOREIGN PATENTS

| Number | Country | Date |
|---|---|---|
| 162,184 | Great Britain | Apr. 28, 1921 |